US005332076A

United States Patent [19]
Ziegert

[11] Patent Number: 5,332,076

[45] Date of Patent: Jul. 26, 1994

[54] MONEY HANDLING APPARATUS AND METHOD FOR USE WITH GAMING MACHINES

[75] Inventor: Werner Ziegert, Wedemark, Fed. Rep. of Germany

[73] Assignee: Bally Wulff Automaten GmbH, Berlin, Fed. Rep. of Germany

[21] Appl. No.: 947,630

[22] Filed: Sep. 21, 1992

[30] Foreign Application Priority Data

Sep. 21, 1991 [DE] Fed. Rep. of Germany ....... 4131832

[51] Int. Cl.[5] .......................... G07F 5/22; G06F 15/28

[52] U.S. Cl. ............................... 194/217; 273/138 A; 364/412

[58] Field of Search ................ 364/412; 194/206, 215, 194/216, 217, 218; 273/138 R, 138 A

[56] References Cited

U.S. PATENT DOCUMENTS

| | | | |
|---|---|---|---|
| 3,269,503 | 8/1966 | Foster | 194/217 |
| 3,828,904 | 8/1974 | Naitou et al. | 194/216 |
| 4,335,809 | 6/1982 | Wain | 273/138 A X |
| 4,636,951 | 1/1987 | Harlick | 364/412 |
| 4,872,541 | 10/1989 | Hayashi | 194/217 |
| 4,964,638 | 10/1990 | Ishida | 364/412 X |
| 5,222,583 | 6/1993 | Bergmann et al. | 194/217 X |

FOREIGN PATENT DOCUMENTS

| | | | |
|---|---|---|---|
| 346254 | 12/1989 | European Pat. Off. | 194/217 |
| 3802600 | 8/1989 | Fed. Rep. of Germany | 273/138 R |
| 3902084 | 7/1990 | Fed. Rep. of Germany | 273/138 A |
| 2134297 | 8/1984 | United Kingdom | 194/217 |

*Primary Examiner*—David A. Bucci
*Assistant Examiner*—Scott L. Lowe
*Attorney, Agent, or Firm*—Jenner & Block

[57] ABSTRACT

A money handling apparatus having a housing and integrated safe for managing the receipt and storage of money for a plurality of money-activated gaming machines. In accordance with the invention, the gaming machines need not have money intake or discharge slots. Intake, discharge and handling of money is managed by the integrated safe, including note intake and money changing, bookings of stakes and winnings as well as the pay-out of winnings, cash monitoring and registration of the cash box contents. A communications channel links the integrated safe to each of the gaming machines. Thus, information regarding credit balances, winnings and losses can be conveyed between the machine and the integrated safe. A display on each machine displays that machine's current credit balance. Credit balances may be transferred between machines or refunded at the conclusion of game play.

16 Claims, 2 Drawing Sheets

MONEY HANDLING APPARATUS AND METHOD FOR USE WITH GAMING MACHINES

FIELD OF THE INVENTION

The present invention relates generally to amusement machines, and in particular to money-operated gaming machines.

BACKGROUND OF THE INVENTION

Known gaming devices, such as slot machines, tend to accumulate large amounts of money (either coins or currency), which from time to time is stolen. For quite some time, makers of gaming devices have searched for effective, cost efficient means for guarding against theft.

One starting point in protecting a gaming machine is the stand or housing in which the machine is placed. Machine housings or stands for slot machines are known in a variety of forms. The German patent publications DE-OS 38 02 600 and DE-OS 39 02 084 both describe a fixture for the accommodation of several slot machines in one stand. Furthermore, the publication DE-PS 38 34 019 describes a safe for change which is integrated in a slot machine stand. Other publications describe the combination of slot machines for money and a safe for the money intake in a machine stand (DE-OS 39 02 097).

In all cases, however, the known combinations of slot machines and safes serve only to safekeep the money inserted into the slot machines. With this, a compromise solution was created which related to complicated, yet still inadequate safety measures against unauthorized withdrawals of money. With the above-mentioned known solutions, however, the only money deposited in the safe is the money which is not required in the coin stacking devices for the payment of winnings or for the repayment of stakes.

With separate slot machines, this money has hitherto been collected and kept in a cash box within the machine. The outcome of this was that depending on how full the cash box was, the loss from unauthorized access to the slot machine was frequently considerable. This problem was partially remediated by placing a safe, along with other safety devices in the interior of the slot machine, as a further step towards the cutting of losses.

SUMMARY OF THE INVENTION

To overcome the disadvantages of the prior art, a money handling apparatus is provided for managing the receipt and storage of money for a plurality of money-activated gaming machines.

Generally, the apparatus includes a housing that is adapted for securely receiving two or more gaming machines. A safe or "money intake" is provided for receiving a deposit of money from a player, determining the value of the deposit and storing the deposit in a cash box or the like. Preferably, the safe is integrated with the housing.

The safe is external to the gaming machines. In this manner, the entire money intake, processing and storage takes place outside the gaming machines, making it impossible to steal money by simply breaking into the gaming machines. Moreover, because the gaming machines do not require their own sub-assemblies for the intake of money, the machines can be made lighter and less expensively.

In one embodiment, a memory or the like records credit balances for each of the gaming machines. The value of the deposited money is credited or "booked" to one of the machines by adding the deposit amount to a selected one of the credit balances (the "target credit balance") that is associated with that particular machine. The player can make this selection by pushing a booking selection key, button or the like.

A communications line connects the safe with each of the gaming machines. The gaming machines are preferably operable only when their respective credit balances have positive values. As the machines are played, they generate winnings and losses, which are communicated via the communications line to the safe. A control device such as a computer increments and decrements the recorded credit balances in accordance with these game outcomes.

The safe also includes a money discharge device for dispensing money from inside the safe to a discharge tray or slot. When a player is done playing on a particular machine, the credit balance associated with that machine (the "source credit balance") may be selected for refund via the money discharge device. This selection may be made by pressing a return selection key, button or the like.

Money can also be transferred from one gaming machine (i.e., credit balance) to another. Preferably, the player selects a source credit balance and target credit balance, again by means of a key, button or the like. The source credit balance is decremented and the target incremented by a predetermined amount. In the illustrated embodiment, the transfer is effected by pressing booking selection and return selection keys at the same time to simultaneously select a source and target credit balance. In this manner, credit balances can be conveniently shifted from one gaming machine to another without requiring the player to insert coins.

DETAILED DESCRIPTION OF THE PREFERRED EMBODIMENT

Figure 1:
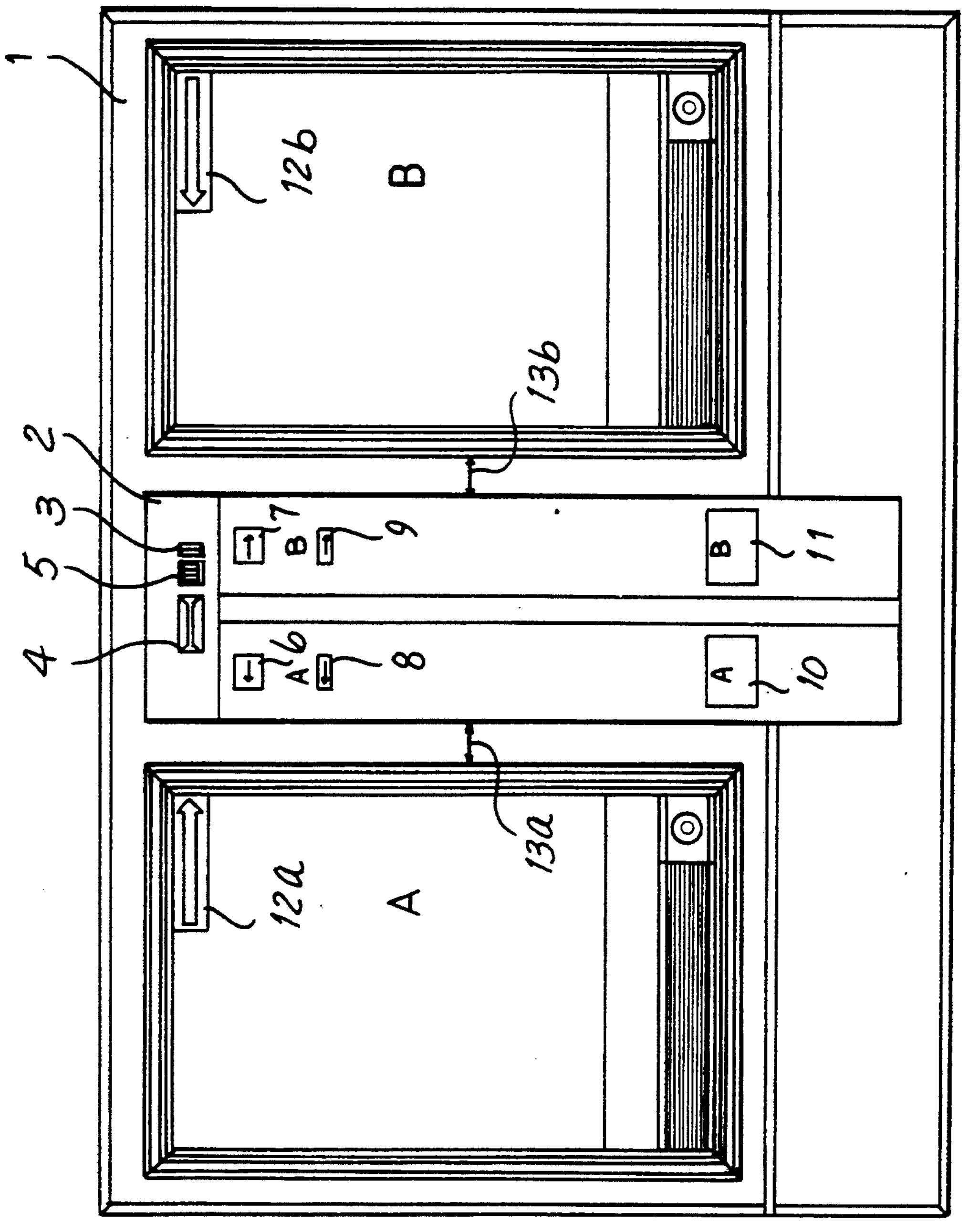
FIG. 1 is a front elevation of a money handling apparatus in accordance with the invention.

FIG. 1 illustrates a front elevation view of a gaming machine money handling apparatus, which includes a gaming machine stand or housing 1 with an integrated safe 2. Gaming machine stand 1 is adapted for securely housing one or more gaming machines, such as gaming machines A and B. Of course, any number of gaming machines can be fixed to the stand 1. The integrated safe 2 is equipped to receive deposits of money, determine the value of the deposited money, securely store the money, and dispense money. Specifically, the safe includes an outer panel which includes money intake slots 3 (for coins) and 4 (for banknotes), function keys 5 through 9 (shown collectively as block 28 in FIG. 2) as well as coin withdrawal trays 10 and 11 for gaming machines A and B, respectively. The internal components (not illustrated in FIG. 1) of the safe 2 include note acceptors, note stackers, coin inspectors, and coin stackers, and a cash box to handle any overfill from the coin stackers. In addition, a display unit can be provided, which is not illustrated, on the front of the safe 2, with which information on user instructions, advertising information, game animation or the like can be presented.

Gaming machines A and B may be any conventional, gaming machines which are adapted for generating a game result corresponding to winnings or losses. For example, gaming machines A and B could be conventional slot machines having payouts of zero or a positive value. Gaming machines A and B do not require (and, preferably, do not have) any devices for receiving or discharging coinage. If older gaming machines having money intake slots are used with the invention, it is recommended that such slots be closed with covers such as 12*a* and 12*b*. The covers 12*a* and 12*b* may include indicia such as an "arrow" advising player to use the money intake slots 3 and 4 of the safe 2.

Gaming machines A and B are adapted for electronic communication with safe 2 via bidirectional links 13*a* and 13*b*, respectively. Bidirectional links 13*a* and 13*b* may be any suitable cabling with plug-in type connections. Cabling for the links data 13*a* and 13*b* can be firmly integrated into the machine stand. In an alternative embodiment, links 13*a* and 13*b* may be optical or radio links. In that case, both safe 2 and slot machines A and B would have their own transmission and reception hardware (not shown in FIG. 1) by which the transport of data can be carried out.

It will be observed that in accordance with the invention, the gaming machines A and B do not require their own money processing and storage facilities. These functions are performed as described below by the safe 2. Because all of the money is stored in the safe's 2 note stackers, coin sackers or cash box (all physically separated from the slot machine), no money is ever present in the slot machines A and B.

Preferably, the functions which are performed by the integrated safe 2 include: (i) money acceptance (both notes and coins); (ii) changing of money (notes into coins); (iii) booking of credits and stakes; (iv) registration and storage of money flow; (v) sorted depositing of money in coin stacking tube devices; (vi) coin storage for the individual coin values and banknote sackers; (vii) protected storage of money inserted; (viii) money return; and (ix) booking transfers from one connected slot machine to another. Any suitable control means can be provided to implement these and other functions described herein.

Figure 2:
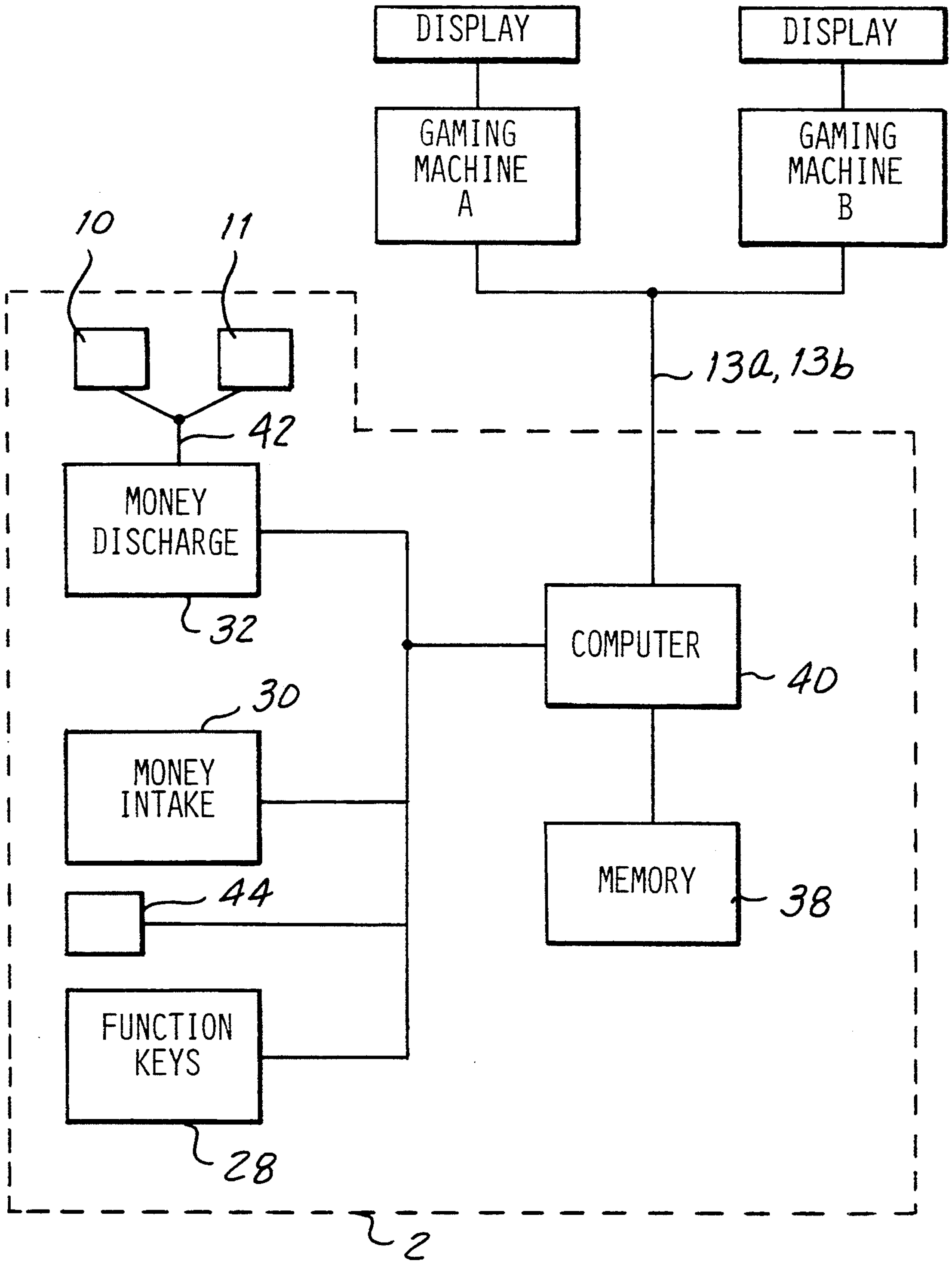
FIG. 2 is a block diagram of the money handling apparatus shown in FIG. 1.

The foregoing arrangement is illustrated by the block diagram of FIG. 2. Integral safe 2 includes a "money intake" 30 and "money discharge" 32. Money intake 30 is provided for receiving a deposit of money from a player, determining the value of the deposit and storing the deposit in a cash box or the like. Money intake 30 includes money intake slots 3 and 4. Preferably, safe 2 is integrated with housing 1.

A memory 38 records credit balances for each of the gaming machines A and B. The value of the deposited money is credited or "booked" to one of the machines A, B by adding the deposited amount to the credit balance (the "target credit balance") associated with that particular machine. The player can select the target credit balance by pushing booking selection keys 6 and 7, as explained below. Credit balances associated with each of machines A and B are displayed by displays 34 and 36, respectively.

Communications lines 13*a* and 13*b* connect safe 2 with each of the gaming machines A and B. The gaming machines are preferably operable only when their respective credit balances have positive values. As the machines are played, they generate winnings and losses, which are communicated via the communications lines 13*a* and 13*b* to safe 2. A control device, here computer 40, increments and decrements the recorded credit balances in accordance with these game outcomes.

Safe 2 also includes money discharge device 32 for dispensing money from inside the safe, and transporting the money to slots 10 and 11 via a controllable shunt 42. When a player is done playing on a particular machine, the credit balance associated with that machine (the "source credit balance") may be selected for refund via the money discharge device. A source credit balance may be selected by pressing return selection keys 8 and 9, as explained below.

A blocking device 44 selectively blocks the money intake slots 3 and 4 (shown generally at block 30 of FIG. 2). Blocking device 44 is actuated to unblock the slots 3 and 4 when the player selects a target credit balance.

The operation of the integrated safe 2 and gaming machines A and B is now described in terms of the function keys 5 through 9. As an overview, the functions associated with each key are as follows:

Key 5—alerts proprietor of gaming machines A and B of a problems, such as a jammed coin;

Key 6—booking selection for slot machine A

Key 7—booking selection for slot machine B;

Key 8—return selection for slot machine A;

Key 9—return selection for slot machine B;

When a player presses the booking selection keys 6 or 7, the otherwise blocked money intake slots 3 and 4 are released (by an electromagnet, for example) so that a player can insert money therein. After the player inserts money into either the slot 3 or 4, the value of the deposited money is determined and then credited to a selected one of gaming machine A (if key 6 was pressed) and B (if key 7 was pressed). This credit balance is then displayed on the display unit of gaming machine A or B, as the case may be. It will be noted that coins and notes are never placed into the gaming machines A and B. Any suitable technique may be used to track the credit balance (associated) with each of the gaming machines A and B. Following the insertion of money, the gaming machines A and B can be operated as with gaming machines already known.

When a player is finished playing, any credit balance displayed by his gaming machine A or B can be refunded by pressing that one of keys 8 and 9 which corresponds to the player's machine A or B. A discharge mechanism inside safe 2 transports money via a controllable shunt (not illustrated in FIG. 1) to coin trays 10 and 11 that is allocated to the respective slot machines A and B, respectively.

Because the slot machines A and B are in communication with integrated safe 2, it is also possible to transfer credit amounts from one slot machine to another, such as from gaming machine A to gaming machine B, for example. The ability to transfer credit balances would be especially useful in the case where a player is playing both gaming machines A and B at the same time. For example, it is possible that one gaming machine (for example, gaming machine A) is running a game sequence and has an inadequate credit balance, while the other machine (in this example, gaming machine B) is not running a game sequence and has a larger credit balance.

In the foregoing example, a player could transfer some or all of the credit balance on the gaming machine B to the gaming machine A by pressing booking key 6 (associated with gaming machine A) at the same time as return key 9 (associated with gaming machine B). This causes credit balance to be transferred from gaming machine B to gaming machine A. Preferably, the transfer takes place in predetermined installments (such as one dollar) per stroke of the booking key 6 and return key 9. It is unnecessary for additional coins or notes to be inserted. By holding down keys 6 and 9, additional amounts are transferred at a predetermined rate (such as one dollar per second). It is also possible to effect transfer in the opposite direction. This procedure allows a player operating both gaming machines A and B connected to the safe 2 at the same time to handle his game sequence and use his game stakes with great flexibility.

As a result of the fact that the entire money intake, processing and storage only now takes place in the safe unit 2, the management of money is more secure. Customary techniques for stealing from the gaming machines A and B will be ineffective against the present invention because no money ever enters the gaming machines.

At the same time, the expenditure and effort involved for maintenance, filling and cash withdrawal are considerably simplified, since only one safe has to be opened for at least two gaming machines. Nor, for this procedure, does the operation of the machines always have to be interrupted.

Another advantage of the development of a combined slot machine stand and safe is the construction of slot machines which can be installed in this combination form is made considerably more simple. These slot machines require no sub-assemblies for the intake of coins or banknotes or the processing, registration and safekeep of same. This fact implies a considerable reduction in terms of both cost and weight of the machines.

The combination of a gaming machine stand and safe can naturally be adapted in its outer design to conform with the rest of the furnishings of an amusement hall or restaurant. Furthermore, it is also possible to adapt the safe casing to match the specific design of the gaming machine, given priority supply of gaming machines of one manufacturer, so that a uniform design effect is given.

What is claimed is:

1. A money handling apparatus for managing the receipt and storage of money for a plurality of money-activated gaming machines, said gaming machines adapted for generating game results corresponding to winnings and losses comprising:

a housing adapted for securely receiving the plurality of gaming machines;

money intake means for receiving a deposit of money from a player, determining the value of said deposit, and storing the money;

memory means for recording a plurality of credit balances, each of said credit balances being associated with one of said plurality of gaming machines;

booking selection means for selecting a target credit balance that is one of said credit balances;

control means for incrementing said target credit balance by the value of the deposit; and communications means for enabling communication of data between said control means and said plurality of machines, said data including said credit balances and said game results;

wherein said money intake means includes at least one money intake slot and blocking means operatively associated with said intake slot for selectively blocking and unblocking the insertion of money into said intake slot, said blocking means being actuated to unblock said slot when the player selects one of said credit balances with said booking selection means;

and wherein said control means increments and decrements said each credit balance in accordance with the game results generated by its respective gaming machine.

2. The apparatus of claim 1 further comprising:

return selection means for selecting a source credit balance that is one of said credit balances; and money discharge means responsive to said return selection means for discharging an amount of money from said money intake means;

wherein said control means reduces said source credit balance by the amount of money discharged from said money discharge means.

3. The apparatus of claim 2 wherein:

said booking selection means and said return selection means may be simultaneously actuated by the player;

said money discharge means is responsive to said booking selection means for discharging money only when said booking selection means has not been actuated by said player;

said control means decrements said source credit balance and increments said target credit balance by a predetermined amount when said booking selection means and said return selection means are simultaneously actuated by the player.

4. The apparatus of claim 1 further comprising:

transfer selection means for selecting a source credit balance that is one of said credit balances;

wherein said control means is responsive to said transfer selection means for decrementing said source credit balance and incrementing said target credit balance by a predetermined amount.

5. The apparatus of claim 1 wherein said communication means is internal to said housing.

6. The apparatus of claim 1 wherein said money intake means is integral to said housing.

7. The apparatus of claim 1 further comprising a display panel mounted to the exterior of said housing for containing a visual display.

8. A system for providing centralized management of the receipt, storage and disbursement of money for a plurality of money-activated gaming machines, comprising a housing adapted for securely receiving a plurality of gaming machines;

a plurality of money-activated gaming machines secured to said housing, each of said gaming machines being adapted for generating a game result and having display means for displaying a credit balance;

money intake means fixed to said housing and external to said plurality of gaming machines for receiving a deposit of money from a player, determining the value of said deposit, and securely storing said money;

a plurality of money withdrawal trays fixed to said housing, each of said trays being associated with a different one of said gaming machines, said trays being adjacent to their respective associated gaming machines;

memory means for recording a plurality of credit balances, each credit balance being associated with a different one of said plurality of gaming machines;

booking selection means for selecting a target credit balance that is one of said credit balances;

return selection means for selecting a source credit balance that is one of said credit balances;

money discharge means responsive to said return selection means for discharging an amount of money from said money intake means, said money discharge means including controllable shunt means for selectively discharging money to that one of said money withdrawal trays that is adjacent to the gaming machine associated with said source credit balance;

communications means for enabling communication of data between said control means and said plurality of gaming machines, said data including data representing said credit balances and said game outcomes; and control means operatively associated with said memory means, said communication means, said booking selection means, and said return selection means for:

incrementing said target credit balance by the value of said deposit;

selectively incrementing and decrementing each of said credit balances in accordance with the game results generated by its associated gaming machine; and decrementing said source credit balance by the amount of money discharged by said discharging means;

wherein each of said plurality of gaming machines is operable when its respective credit balance is greater than zero, and each of said gaming machines displays its respective credit balance on said display means.

9. The apparatus according to claim 8 wherein:

said booking selection means and said return selection means may be simultaneously actuated by the player;

said money discharge means is responsive to said booking selection means for discharging money only when said booking selection means is not actuated by the player;

said control means decrements said source credit balance and increments said target credit balance by a predetermined amount when said booking selection means and said return selection means are simultaneously actuated by a the player.

10. The apparatus of claim 8 wherein said money intake means includes at least one money intake slot and blocking means operatively associated with said intake slot for selectively blocking and unblocking the insertion of money into said intake slot, said blocking means being actuated to unblock said slot when the player selects one of said credit balances with said booking selection means.

11. The apparatus of claim 8 wherein said communication means is internal to said housing.

12. The apparatus of claim 8 wherein said money intake means is physically separated from said plurality of gaming machines.

13. The apparatus of claim 8 further comprising a display panel mounted to the exterior of said housing for containing a visual display.

14. A method for managing the receipt, storage and disbursement of money for a plurality of money-activated gaming machines adapted for generating a game result and secured to a housing having an integrated safe that is external to the gaming machines, comprising the steps of:

(a) providing at least one money intake slot to accept a deposit of money from a player;

(b) determining the value of said deposit;

(c) securely storing said deposit in the safe;

(d) recording a plurality of credit balances, each credit balance associated with one of said plurality of gaming machines, and enabling operation of said gaming machines when their respective credit balances are positive;

(e) selecting a target credit balance that is one of said recorded credit balances;

(f) incrementing said target credit balance by the value of said deposit;

(g) incrementing and decrementing said credit balances in accordance with the game results generated by their respective gaming machines; and (h) blocking the insertion of money into said intake slot unit the step of selecting a target credit balance has been performed.

15. The method of claim 14 further comprising the steps of:

(i) selecting a source credit balance that is one of the recorded credit balances;

(j) providing a plurality of money withdrawal trays, and placing each tray adjacent to a different one of said gaming machines;

(k) disbursing an amount of money from the safe to that one of said trays which is adjacent to the gaming machine associated with said source credit balance; and (j) reducing said source credit balance by the amount of money disbursed to the player in said step (k).

16. The method according to claim 14 further comprising the steps of:

(i) selecting a source credit balance that is one of the recorded credit balances; and (j) increasing said target credit balance and decreasing said source credit balance by a predetermined amount.

* * * * *

UNITED STATES PATENT AND TRADEMARK OFFICE

CERTIFICATE OF CORRECTION

PATENT NO. : 5,332,076

DATED : July 26, 1994

INVENTOR(S) : Werner Ziegert

It is certified that error appears in the above-indentified patent and that said Letters Patent is hereby corrected as shown below:

On the title page, Item [56]:
Under "Foreign Patent Documents" insert:
--3834019 4/1990 Fed. Rep. of Germany--
-- 392731 10/1990 European Pat. Off.--

Col. 7, line 31, delete "discharging" and insert therefor --discharge--.

Col. 8, line 34, delete "unit" and insert therefor --until--; and line 47, delete "(j)" and insert therefor --(1)--.

Signed and Sealed this

Twenty-seventh Day of September, 1994

Attest:

BRUCE LEHMAN

Attesting Officer

Commissioner of Patents and Trademarks